(12) United States Patent
Claeys et al.

(10) Patent No.: US 9,010,071 B2
(45) Date of Patent: Apr. 21, 2015

(54) BALER WITH AN IMPROVED STRIPPER ROLL

(75) Inventors: Danny Claeys, Oedelem (BE); Jan Van Groenigen, Varsenare (BE); Johan Vande Ryse, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 688 days.

(21) Appl. No.: 13/389,749

(22) PCT Filed: Aug. 10, 2010

(86) PCT No.: PCT/EP2010/061616
§ 371 (c)(1),
(2), (4) Date: Apr. 23, 2012

(87) PCT Pub. No.: WO2011/018455
PCT Pub. Date: Feb. 17, 2011

(65) Prior Publication Data
US 2012/0204735 A1  Aug. 16, 2012

(30) Foreign Application Priority Data
Aug. 10, 2009  (BE) .................................. 2009/0480

(51) Int. Cl.
*A01F 15/07* (2006.01)
*A01F 15/14* (2006.01)
*A01F 15/18* (2006.01)

(52) U.S. Cl.
CPC ............. *A01F 15/0715* (2013.01); *A01F 15/18* (2013.01); *A01F 2015/186* (2013.01)

(58) Field of Classification Search
CPC ......... A01F 15/07; A01F 15/14; A01F 15/18; A01F 2015/186; B65B 11/04; B65B 63/04
USPC ........... 53/465, 587, 118, 211, 212, 215, 216; 100/5, 40, 87, 88, 89, 8, 76, 172, 174; 56/341, 461, 10.2 R
See application file for complete search history.

(56) References Cited

U.S. PATENT DOCUMENTS

| | | | | | |
|---|---|---|---|---|---|
| 3,847,073 | A | * | 11/1974 | Mast et al. ..................... | 100/88 |
| 3,859,909 | A | * | 1/1975 | Mast .............................. | 100/88 |
| 3,866,531 | A | * | 2/1975 | Todd et al. ..................... | 100/88 |
| 4,444,098 | A | * | 4/1984 | Soteropulos ................... | 100/88 |
| 4,581,879 | A | * | 4/1986 | Anstey ........................... | 56/341 |
| 4,768,432 | A | * | 9/1988 | Storlie ........................... | 100/89 |
| 4,870,812 | A | * | 10/1989 | Jennings et al. ............... | 56/341 |
| 4,956,968 | A | * | 9/1990 | Underhill ........................ | 56/341 |
| 5,020,299 | A | * | 6/1991 | Underhill ........................ | 53/399 |
| 5,181,461 | A | * | 1/1993 | Viaud ............................. | 100/88 |
| 5,191,833 | A | * | 3/1993 | Clevenger, Jr. ................ | 100/88 |
| 5,243,806 | A | * | 9/1993 | Jennings et al. ............... | 53/118 |
| 5,408,925 | A | * | 4/1995 | McClure et al. ............... | 100/88 |
| 5,419,108 | A | * | 5/1995 | Webb et al. .................... | 56/341 |
| 5,479,767 | A | * | 1/1996 | McClure et al. ............... | 56/343 |
| 5,581,976 | A | * | 12/1996 | Underhill ........................ | 53/399 |
| 5,687,548 | A | * | 11/1997 | McClure et al. ............... | 53/399 |
| 5,855,109 | A | * | 1/1999 | Vande Ryse et al. .......... | 56/341 |

(Continued)

*Primary Examiner* — Hemant M Desai
*Assistant Examiner* — Eduardo R Ferrero
(74) *Attorney, Agent, or Firm* — Patrick M. Sheldrake; Seyed V. Sharifi T.

(57) ABSTRACT

Stationary plates are mounted in the spaces between the segments of a roll. At least one of the plates comprises a cam-like extension, protruding from the roll surface for preventing wrapping material from wrapping around the roll.

9 Claims, 7 Drawing Sheets

(56) References Cited

U.S. PATENT DOCUMENTS

| | | | |
|---|---|---|---|
| 5,941,168 A * | 8/1999 | Kluver et al. | 100/87 |
| 6,021,622 A * | 2/2000 | Underhill | 53/118 |
| 6,094,900 A * | 8/2000 | Underhill et al. | 56/341 |
| 6,145,292 A * | 11/2000 | Underhill | 56/341 |
| 6,209,450 B1 * | 4/2001 | Naaktgeboren et al. | 100/4 |
| 6,550,218 B2 * | 4/2003 | McClure et al. | 53/118 |
| 6,681,688 B1 * | 1/2004 | Smith | 100/5 |
| 6,722,100 B1 * | 4/2004 | Underhill | 53/118 |
| 6,981,355 B2 * | 1/2006 | McClure et al. | 53/399 |
| 7,162,950 B2 * | 1/2007 | McClure et al. | 100/8 |
| 2001/0023223 A1 * | 9/2001 | Mornet et al. | 492/45 |
| 2005/0198936 A1 * | 9/2005 | Viaud | 56/341 |
| 2007/0084146 A1 * | 4/2007 | McClure et al. | 53/430 |
| 2008/0092756 A1 * | 4/2008 | Vande Ryse | 100/5 |
| 2008/0148703 A1 * | 6/2008 | Smith et al. | 56/341 |
| 2012/0204735 A1 * | 8/2012 | Claeys et al. | 100/5 |

* cited by examiner

BALER WITH AN IMPROVED STRIPPER ROLL

This application is the US National Stage filing of International Application Serial No. PCT/EP2010/061616 filed on Aug. 10, 2010 which claims priority to Belgium Application BE2009/0480 filed Aug. 10, 2009, each of which is incorporated herein by reference in its entirety.

TECHNICAL FIELD

The present invention is related to agricultural round balers, used for picking up crop material such as hay or straw from the field and forming it into cylinder-shaped packages.

BACKGROUND ART

Prior art round balers generally have a bale forming chamber defined by an apron comprising an array of side-by-side belts, transverse slats trained on chains, a plurality of rolls or a combination of these various elements, e.g., rolls and belts. Crop material, such as hay, is picked up from the ground as the baler traverses the field, fed into a fixed or variable chamber where it is accumulated and compressed to form a cylindrical package of crop material. The formed package, while in its compacted condition inside the baling chamber, is wrapped with net, plastic film, twine or the like, to produce a completed round bale that is then ejected from the baling chamber onto the ground for subsequent handling.

Wrapping systems include a means for supplying wrapping material into the bale forming chamber, wherein a formed bale is rotating. According to a know baler, the wrapping material is inserted in the area directly above the so-called 'stripper roll'. The net or plastic film is then wrapped around the bale after which the wrapped bale is ejected from the baler. Examples of such systems are disclosed in documents EP-A-432830, EP-A-681782, EP-A-766912 and EP-A-1264533. A problem of these systems is the fact that wrapping material may become wrapped around the stripper roll. Especially in wet conditions and when using plastic film, this problem tends to be prominent.

Mechanisms exist for scraping off crops that are sticking to one of the rolls that are guiding the apron, as shown for example in EP-A-152085, but these mechanisms are not effective for removing web material wrapped around the roll, in particular when it concerns plastic film.

DISCLOSURE OF INVENTION

It is an object of the invention to provide a round baler equipped with a means for inserting wrapping material, wherein the above named problem of the wrapping material becoming wrapped around a roll is avoided.

According to the present invention there is provided a round baler for forming cylindrical bales of crop material, the baler comprising:
 a main frame comprising opposing side walls;
 means for defining a bale forming chamber with a transverse inlet, these means comprising an apron assembly, comprising crop engaging means disposed between the side walls, and configured to rotate a formed bale in a first direction;
 these means further comprising at least one roll extending along the width of the bale forming chamber and configured to rotate in the direction opposite to the first direction;
 means for feeding crop material to the bale forming chamber through the inlet whereby the crop material accumulated in the bale forming chamber is engaged by the crop engaging means to form the crop material into a compacted cylindrical package in the bale forming chamber;
 a supply of a continuous sheet of wrapping material;
 a dispensing assembly, comprising insertion means, for selectively dispensing the sheet of wrapping material into the bale forming chamber for wrapping the periphery of the cylindrical package of crop material to form a round bale, whereby the sheet of wrapping material is inserted in a space directly in the vicinity of the roll,
 the roll comprises a plurality of segments, arranged side-by-side in the axial direction of the roll, the segments being fixed to the rotation axis of the roll, and wherein stationary plates are mounted in the spaces between the segments, at least one of the plates comprising a cam-like extension, protruding from the roll surface for preventing wrapping material from wrapping around the roll.

In this way the end of the wrapping material can be gripped easily by the rotating bale and the wrapping material is not wrapped around the stripper roll itself and this without negatively affecting the operation of the stripper roll itself. The stationary plates and the segments are mounted in close relation to each other which prevents that for example crop material would stick in between the segments.

BRIEF DESCRIPTION OF DRAWINGS

The invention will now be further described, by way of example, with reference to the accompanying Figures, in which.

MODE(S) FOR CARRYING OUT THE INVENTION

Figure 1:
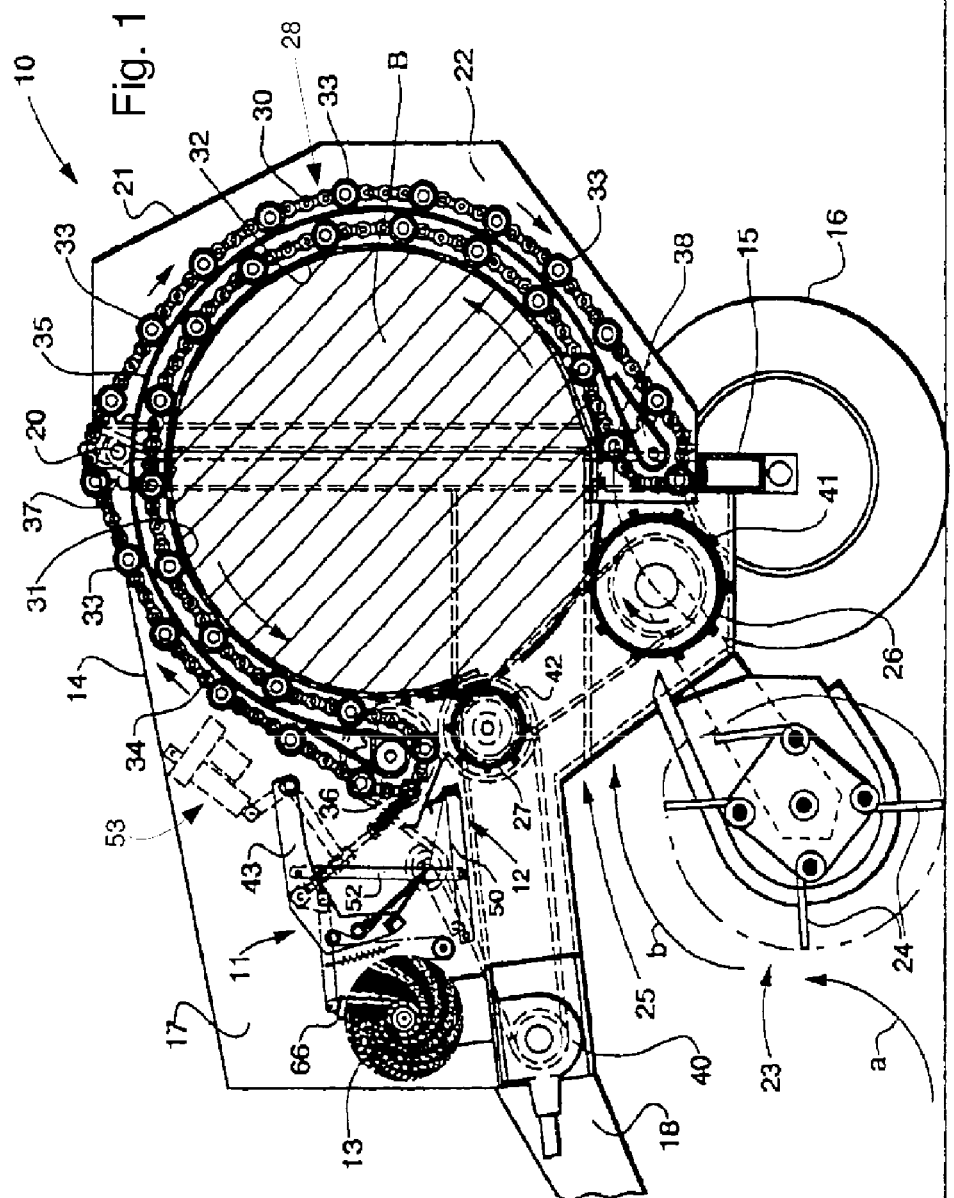
FIG. 1 represents a view of a type of round baler known in the art.

FIG. 1 shows a round baler 10 of the type described in EP-A-766912, on the basis of which the invention is described. It is emphasized however that the invention is applicable to other round baler types as well. Round baler 10 of FIG. 1 includes a main frame 14 with a main support beam 15 on which a pair of wheels 16 (only one shown) is rotatably affixed. The main frame includes a pair of side walls 17, 17' between which a cylindrical bale forming chamber extends. For the purposes of clarity only one wall 17 is shown in FIG. 1 and the elements mounted inwardly thereof are shown in full lines for clarity, which is an approach not uncommon in the descriptions in prior art patents. For illustrative purposes reference letter B is used to designate a bale, shown in cross section in the bale forming chamber.

Baler 10 also includes a drawbar 18 extending from the forward portion of main frame 14 for conventional connection to a tractor. Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pick-up assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the bale forming chamber defined by a floor roll 26 and a transverse stripper roll 27, both of which rolls are rotatably supported on main frame 14 between sidewalls 17.

The bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point adjacent stub shafts 20 during bale discharge. The apron further comprises a plurality of parallel tubular crop engaging slats 33 extending between chains 30 to provide a cage-like periphery of the cylindrically shaped bale forming chamber. Radially outward of the inner run of apron assembly 28 are front and rear sections 34, 35 of a continuous cylindrical bale chamber wall. These sections, also separable during bale discharge are mounted between side walls 17 and tailgate walls 22, respectively, for maintaining integrity between the outer and inner runs of chain 30. Operatively engaged with chains 30 are drive sprockets 36 mounted between sidewalls 17, idler sprockets 37 also mounted between sidewalls 17 on shaft 20, and idler sprockets 38 mounted between tailgate walls 22. A conventional chain drive system for drive sprockets 36 is provided via appropriate coupling to gearbox 40 in a conventional manner, diagrammatically depicted in phantom outline, outwardly of sidewall 17. The bale forming chamber is further defined by the outer surfaces of floor roll 26 and stripper roll 27, both of which are driven in a clockwise direction by conventional drive means appropriately coupled to gear box 40. These rolls are for example provided with ribs 41, 42 to enhance their ability to convey crops in the chamber as a bale is being formed. Other forms of aggressive surface structure may be used to accommodate various types of crops and conditions.

The baler further comprises a dispensing assembly 11 for a wrapping material, such as a net or web or plastic film, issued from a supply roll 13, and a severing assembly 12. The dispensing assembly 11 is coupled to an actuator assembly 53, arranged to move the dispensing arms 43, 43' from a retracted position shown in FIG. 1 to a position wherein the wrapping material is guided towards the insertion space between stripper roll 27 and a guide plate 72. The severing assembly 12 is also coupled to the actuator 53 by means of a rod 52 to move between a cutting position wherein an arm 50 with a movable knife contacts a stationary knife to cut the wrapping material and a position wherein the wrapping material can be guided unobstructed between the movable knife and the stationary knife. Further details of the dispensing assembly are described in EP-A-766912.

Figure 2:
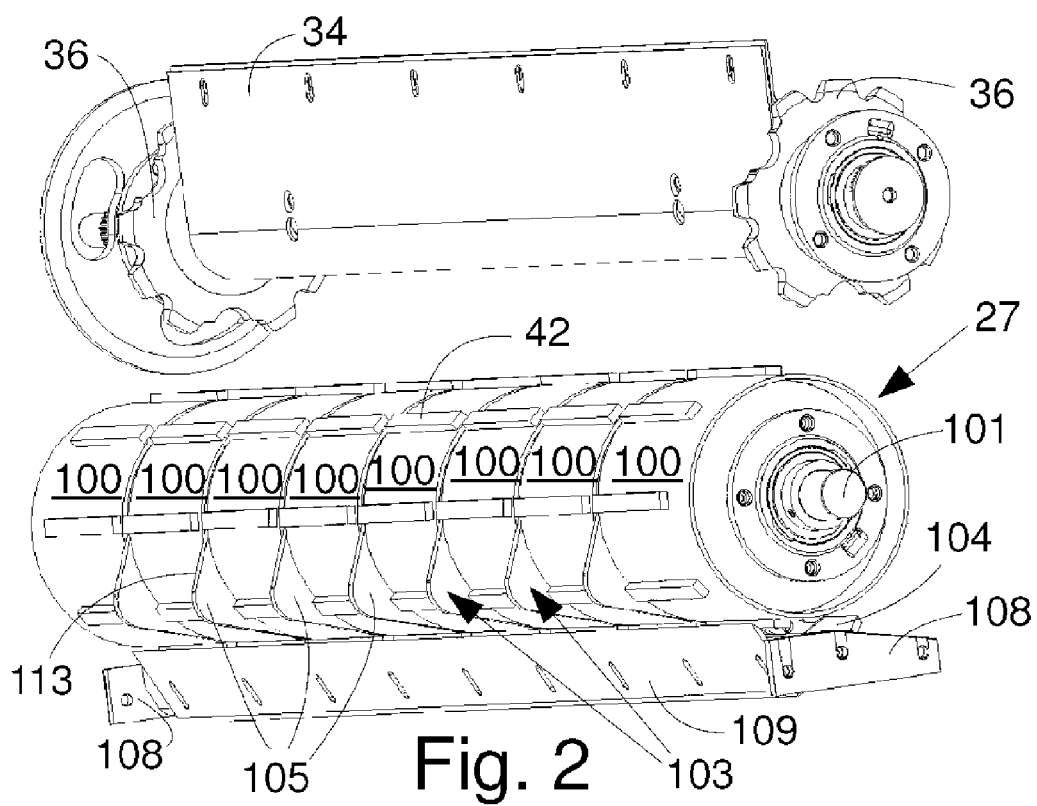
FIG. 2 is a perspective view of the front of a stripper roll in a baler according to the invention.
Figure 3:
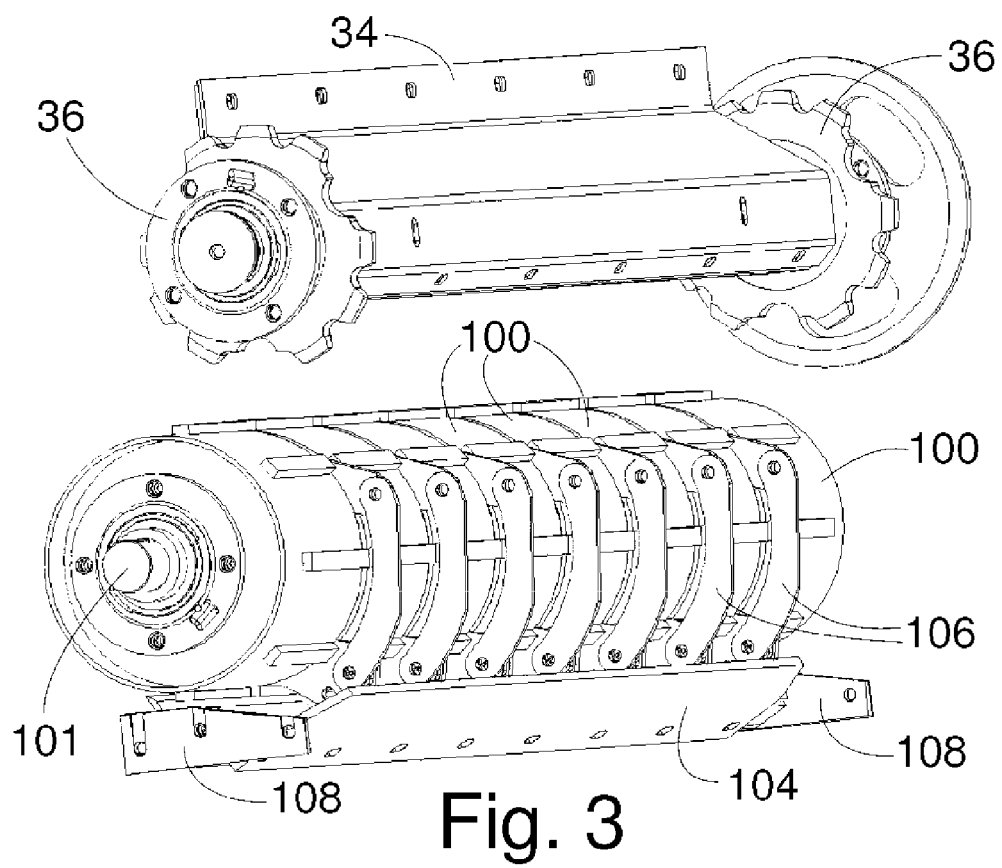
FIG. 3 is a perspective view of the back of the stripper roll of FIG. 2.
Figure 4:
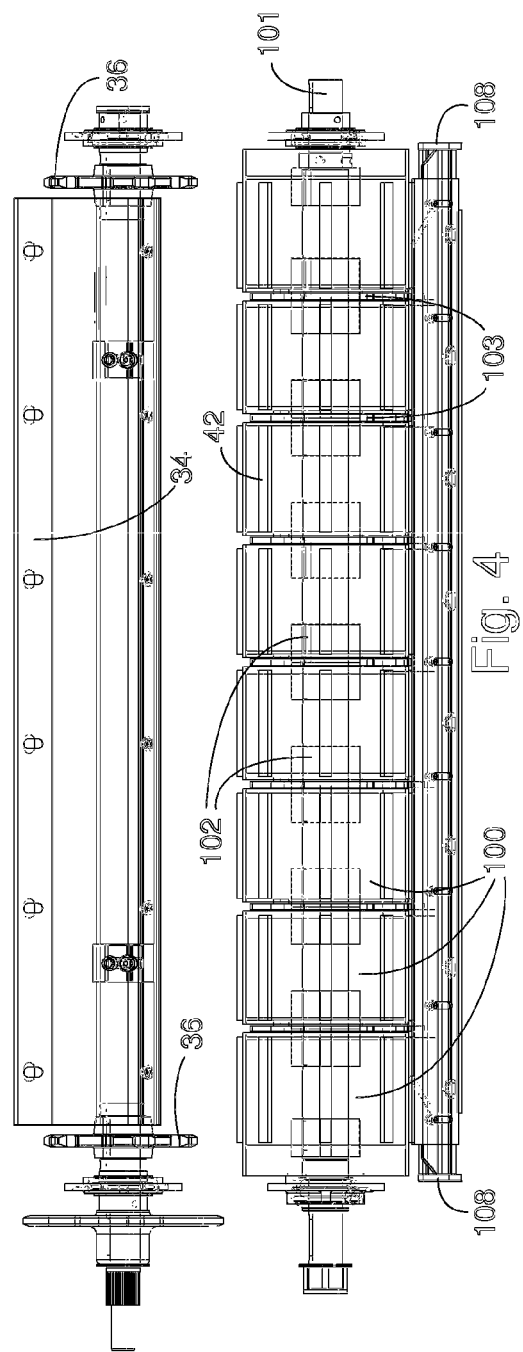
FIGS. 4 and 5 are front and side views of the stripper roll of FIG. 2.
Figure 5:
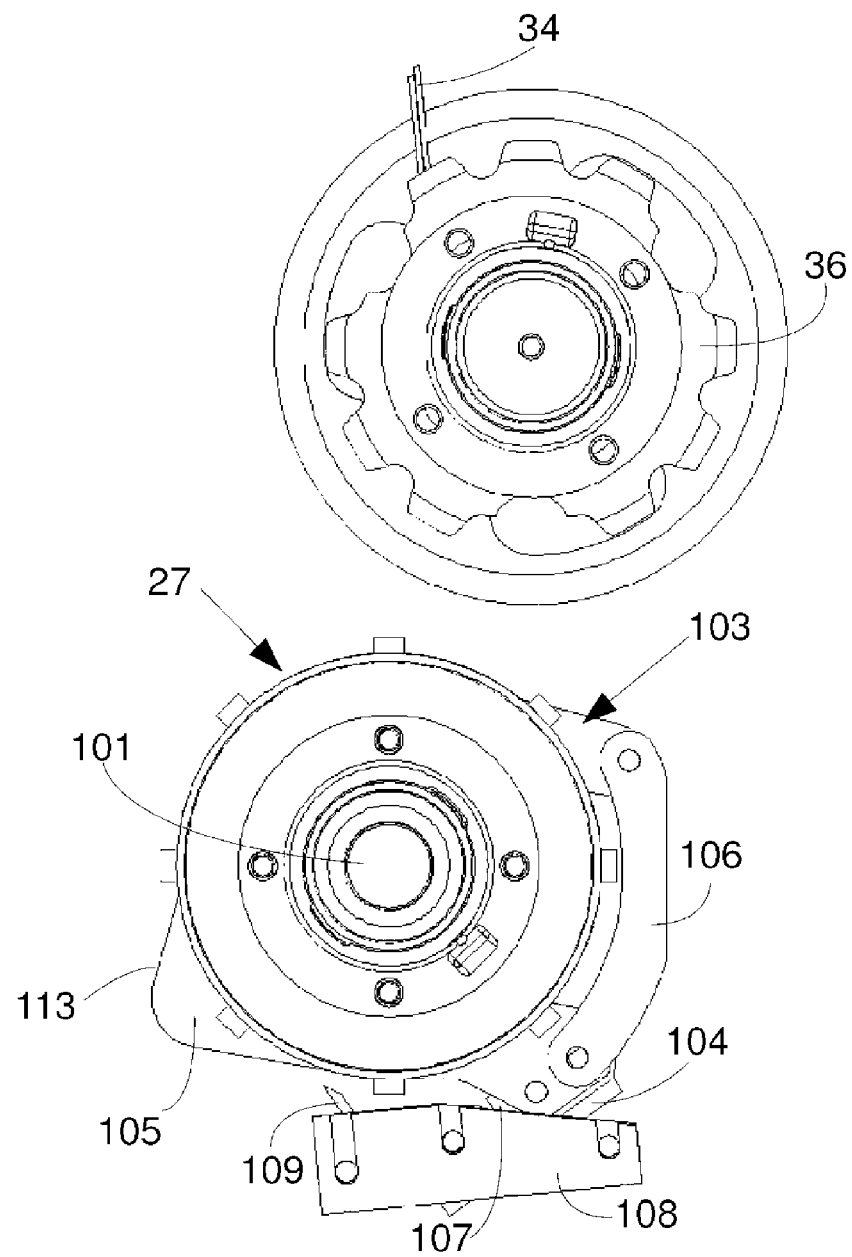

The present invention centres around the roll 27, which is the stripper roll in the case of FIG. 1, but the invention is applicable to any roll arranged to define the bale forming chamber, as long as the roll is configured to rotate in the direction opposite from the bale rotation, and the wrapping material is inserted in the space in the vicinity of, for example directly above, the roll 27, so that the sheet of wrapping material is guided into the bale forming chamber by the rotating roll (as it is the case for the stripper roll 27 in FIG. 1). FIGS. 2 and 3 show a detailed view of the stripper roll 27 and the sprockets 36, as seen respectively from the bale forming chamber (front view, FIG. 2) and from the opposite side (back view, FIG. 3). FIGS. 4 and 5 show front and side views of the same assembly drawings. In between the sprockets 36 is the end of the front section 34 of the continuous cylindrical bale chamber wall. As seen in FIG. 2, the stripper roll 27 comprises an assembly of segments 100, arranged side-by-side in the axial direction of the roll, and which are fixed to the rotating axis 101 of the stripper roll 27, e.g. by keyed collar elements 102. The collar elements 102 are visible in the plane view of FIG. 4.

Figure 6:
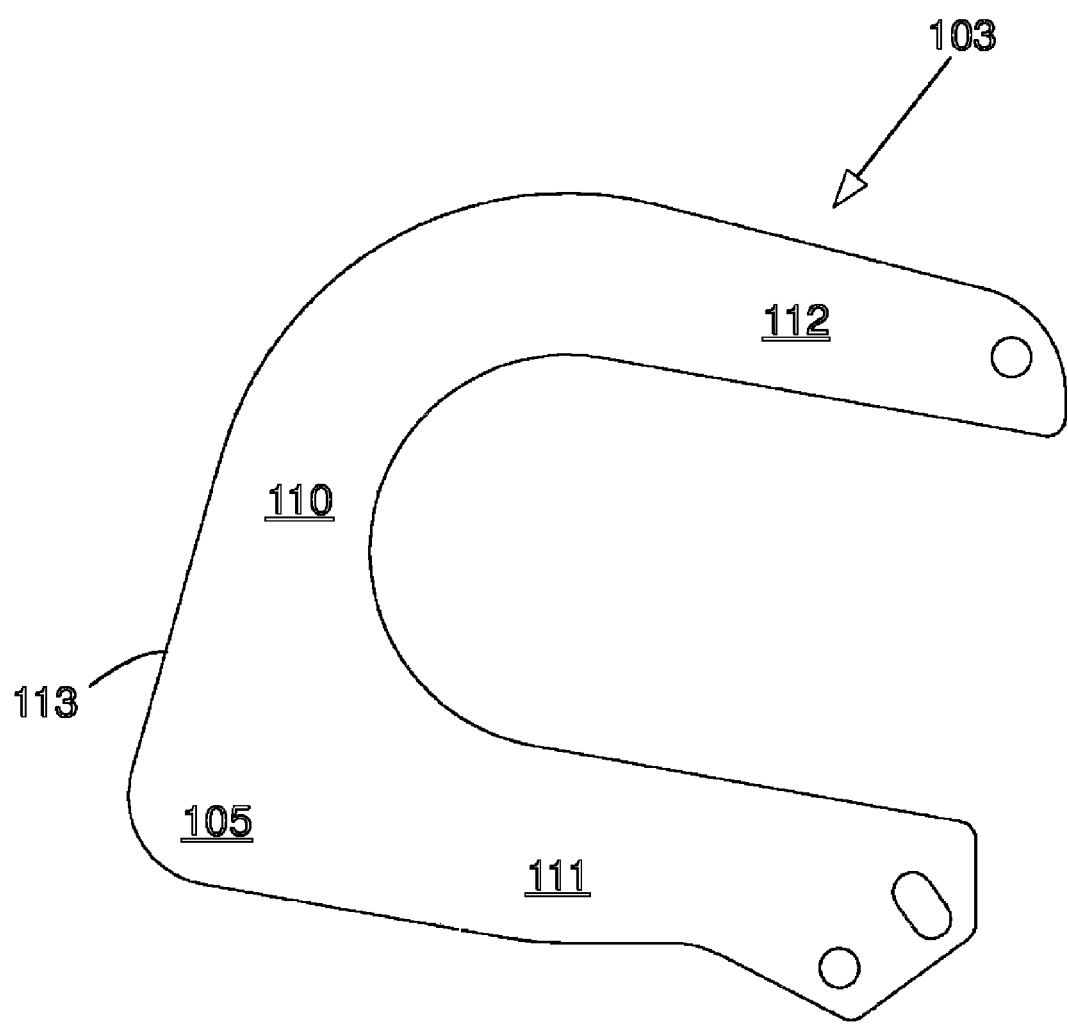
FIG. 6 shows a detail of a U-shaped plate used in a baler according to the invention.

The segments 100 are thus uniform with the rotation axis 101. In between these segments 100, U-shaped plates 103 are stationary mounted with respect to the rotatable segments 100. The plates 103 are mounted on a support frame 104, which is rigidly attached to the main frame 14. At the front of each of the U-shaped plates, a cam-like extension 105 is present, which protrudes from the surface of the rotating segments 100. A detail of the of U-shaped plates is shown in FIG. 6 and discussed further in the description.

Figure 7:
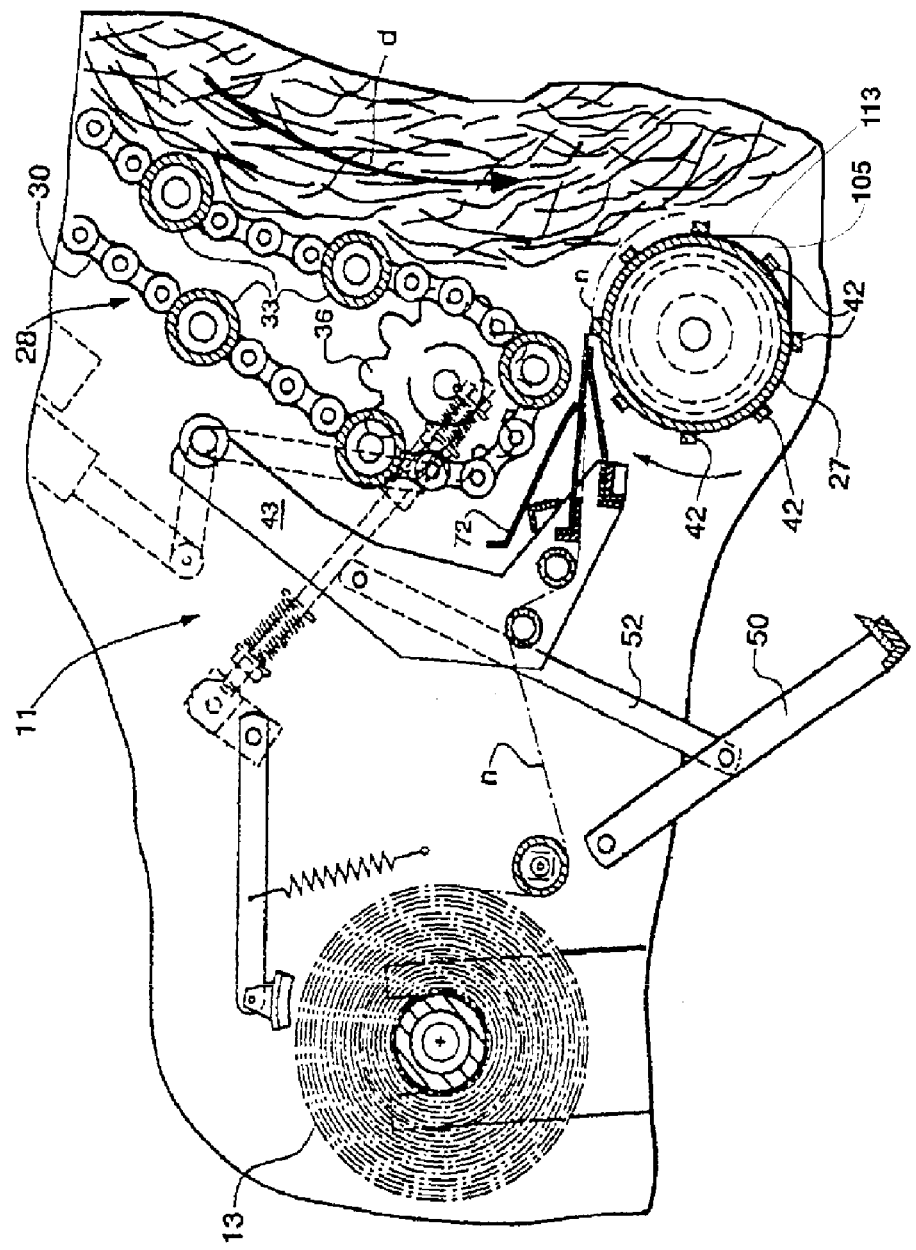
FIG. 7 shows a detail of a round baler according to the invention.

As seen in FIG. 7, the wrapping material n is inserted into the space directly above the stripper roll 27, between the roll 27 and the crop engaging slats 33, as they pass over the sprockets 36. This insertion of the wrapping material takes place when a bale is fully formed and rotates inside the bale forming chamber (see arrow d in FIG. 7). The end of the wrapping material thus passes between the stripper roll and the bale, attaches to the outer side of the bale, and finally wraps around the bale during the course of two or three revolutions. As stated above, especially in wet weather conditions, the wrapping material may become attached to the stripper roll surface and the wrapping material may therefore become wrapped around the stripper roll instead of the bale.

The stripper roll 27 according to the invention solves this problem because of the cam-like extensions 105. The wall 113 of the cam-like extensions 105 that is located closest to the crop material in the bale forming chamber is mounted (as visible in FIG. 7), substantially tangential to the circular bale forming chamber, preferably with a small acute angle, for example 2° to 10° with respect to the tangential direction in order to on the one hand act as quickly as possible on the wrapping material that has the tendency to wrap around the stripper roll 27, but on the other hand to prevent that the cam-like extension would contact the wrapping material that is wrapped correctly around the bale in order to prevent possible damage of this wrapping material. In this way, the end of the wrapping material is taken up easily by the rotating bale, and the wrapping material is not wrapped around the stripper roll 27 itself. The height and shape (in particular the curvature) of the cam-like extensions is chosen so as to perform this function, without damaging the wrapped bale. According to an embodiment of the cam-like extension 105, the cam-like extension extends for example 40 mm to 50 mm out of the surface of the stripper roll 27 with a diameter of for example 220 mm to 240 mm and the cam-like extension 105 has a thickness of approximately 10 mm.

Further details of the embodiment shown in the Figures are given hereafter. As seen in FIGS. 5 and 6, the U-shaped plates 103 have a rounded portion 110, encompassing the roll's axis 101, and two leg portions 111 and 112. The cam-like extension 105 is located on the lower half of the rounded portion 110. The rounded portion's circumference does not extend beyond the roll's outer surface, except at the position where the cam-like extension 105 is located. At the back of the stripper roll 27, the leg portions are connected by brackets 106. The lower leg portions 111 of the plates 103 are bolted to upstanding brackets 107 which are uniform with (e.g. welded to) the support frame 104. The support frame 104 is further attached between side plates 108 which are bolted to the side walls 17,17'. The support frame 104 is further equipped with a scraper 109, arranged to scrape crop material that has become stuck to the stripper roll 27. Each of the segments 100 is provided with ribs 42. These ribs 42 may be parallel to the rotation axis 101, or may be positioned at an angle to the rotation axis 101. It is clear to the skilled person that the plates 103 may have a different shape or a different means of being attached to the baler frame than described above, as long as the plates are provided with a cam-like extension 105 which extends, when the plates 103 are mounted, beyond the circumference of the roll 27.

The segments 100 can be constructed and attached to the axis 101 in a similar way as shown in document EP-A-681782, where a segmented starter roll is shown, having a series of knives positioned in between the segments. In that case, the starter roll comprises two outer segments, each including end walls to which collars are affixed for attaching the outer segments to the axis, and a number of inner segments, each including an inner wall to which a pair of collars are affixed.

As stated above, the invention is applicable to any type of round baler. In a baler of the type described in EP-A-432830 for example, the apron is formed of a plurality of flat belts arranged side-by-side and supported on guide rolls. The bale forming chamber is defined by the apron, a floor roll and a number of rolls arranged in a sledge assembly, which is pivotable between a bale starting position and a full bale position. The wrapping material is inserted as it passes over a stripper roll and a driven roll arranged in the sledge assembly underneath the stripper roll. The stripper roll and/or the driven roll may be produced as described above, i.e. comprising rotatable segments and stationary plates, the plates having cam-like extensions for preventing wrapping material to wrap around the roll.

The invention as defined by the claims is not limited to the embodiments described by way of example and shown in the drawings, but can equally comprise combinations and variations that fall within the scope of the claims.

What is claimed is:

1. A round baler for forming cylindrical bales of crop material, the baler comprising:
   a main frame comprising opposing side walls;
   a bale forming chamber comprising a transverse inlet, comprising an apron assembly, comprising a crop driving assembly disposed between the side walls, and configured to rotate a formed bale in a first direction;
   the crop driving assembly comprising at least one roll extending along the width of the bale forming chamber and configured to rotate in the direction opposite to the first direction;
   crop material feeder configured for transporting crop to the bale forming chamber through the inlet;
   a wrapping material dispensing assembly for selectively inserting and dispensing wrapping material into the bale forming chamber for wrapping a bale, whereby wrapping material is inserted in a space directly in the vicinity of the roll; and,
   the roll comprises a plurality of segments, arranged side-by-side in the axial direction of the roll, the segments being fixed to the rotation axis of the roll, and wherein stationary plates are mounted in the spaces between the segments, at least one of the plates comprising a cam-like extension, protruding from the roll surface for preventing wrapping material from wrapping around the roll.

2. A round baler according to claim 1, wherein the roll is a stripper roll, and wherein the wrapping material dispensing assembly has an insertion arm configured to insert the sheet of wrapping material into the space above the stripper roll.

3. A round baler according to claim 1, wherein the plates are mounted on a support frame which is rigidly connected to the main frame of the baler.

4. A round baler according to claim 1, wherein any the stationary plates are U-shaped plates comprising a rounded portion encompassing the rotation axis of the roll and two leg portions, wherein the cam-like extension is located on the rounded portion.

5. A round baler according to claim 4, wherein the lower of the two leg portions of each stationary plate is mounted on a support bracket mounted on the support frame.

6. A round baler according to claim 4, wherein the leg portions are interconnected by brackets.

7. A round baler according to claim 1, wherein the support frame further comprises a scraper, arranged along the width of the roll.

8. A round baler according to claim 1, wherein the apron assembly further comprises a plurality of support chains mounted to travel along a continuous path and a plurality of parallel tubular crop engaging slats extending between the chains to provide a cage-like periphery of the cylindrically shaped bale forming chamber.

9. A round baler according to claim 1, wherein the apron assembly further comprises a plurality of flat belts arranged side-by-side and supported on guide rolls, the baler further comprising a plurality of rolls arranged in a sledge assembly, which is pivotable between a bale starting position and a full bale position, and wherein said roll is arranged in the sledge assembly.

* * * * *